(12) United States Patent
Brown

(10) Patent No.: US 6,837,668 B1
(45) Date of Patent: Jan. 4, 2005

(54) LOAD CARRYING BODY

(75) Inventor: David John Bowes Brown, Boltby (GB)

(73) Assignee: Multidrive Limited (GB)

( * ) Notice: Subject to any disclaimer, the term of this patent is extended or adjusted under 35 U.S.C. 154(b) by 134 days.

(21) Appl. No.: 10/018,414

(22) PCT Filed: Jun. 13, 2000

(86) PCT No.: PCT/GB00/02277
§ 371 (c)(1),
(2), (4) Date: May 9, 2002

(87) PCT Pub. No.: WO00/76806
PCT Pub. Date: Dec. 21, 2000

(30) Foreign Application Priority Data

Jun. 15, 1999 (GB) .............................................. 9913952

(51) Int. Cl.⁷ .................................................. B60P 1/38
(52) U.S. Cl. ........................ 414/521; 414/515; 414/527; 414/510
(58) Field of Search ................................ 414/521, 515, 414/514, 527, 510

(56) References Cited

U.S. PATENT DOCUMENTS

| | | | |
|---|---|---|---|
| 3,593,864 A | * | 7/1971 | Moser ........................ 414/528 |
| 3,704,798 A | | 12/1972 | Carpenture, Jr. |
| 4,111,318 A | * | 9/1978 | Lutz ............................ 414/521 |
| 4,531,680 A | | 7/1985 | Groeneweg |
| 4,747,747 A | * | 5/1988 | Fusco et al. ................. 414/528 |

FOREIGN PATENT DOCUMENTS

| | | | |
|---|---|---|---|
| CA | 561919 | * 8/1958 | ................. 414/521 |
| EP | 0027409 | 10/1980 | |
| EP | 0081695 A1 | 11/1982 | |
| EP | 0343518 | 5/1989 | |
| EP | 0360235 A2 | 9/1989 | |
| GB | 419351 | 6/1934 | |
| JP | 61018531 | 1/1986 | |

* cited by examiner

Primary Examiner—Steven A. Bratlie
(74) Attorney, Agent, or Firm—Levisohn, Berger & Langsam LLP

(57) ABSTRACT

A floor constituted by a flexible belt (23), resting on the upper surface of a loadbearing base, has one end connected to a headboard (17) and the other end connected to a winch (28). A cable (33) has one end connected to the headboard and the other end connected to the winch. A guide system for the cable including a compensating mechanism (36, 56, 57) which varies the path of the cable during rotation of the winch, so as to compensate for a difference between the belt diameter and the cable diameter on the winch, the difference varying as the belt is wound and unwound.

11 Claims, 11 Drawing Sheets

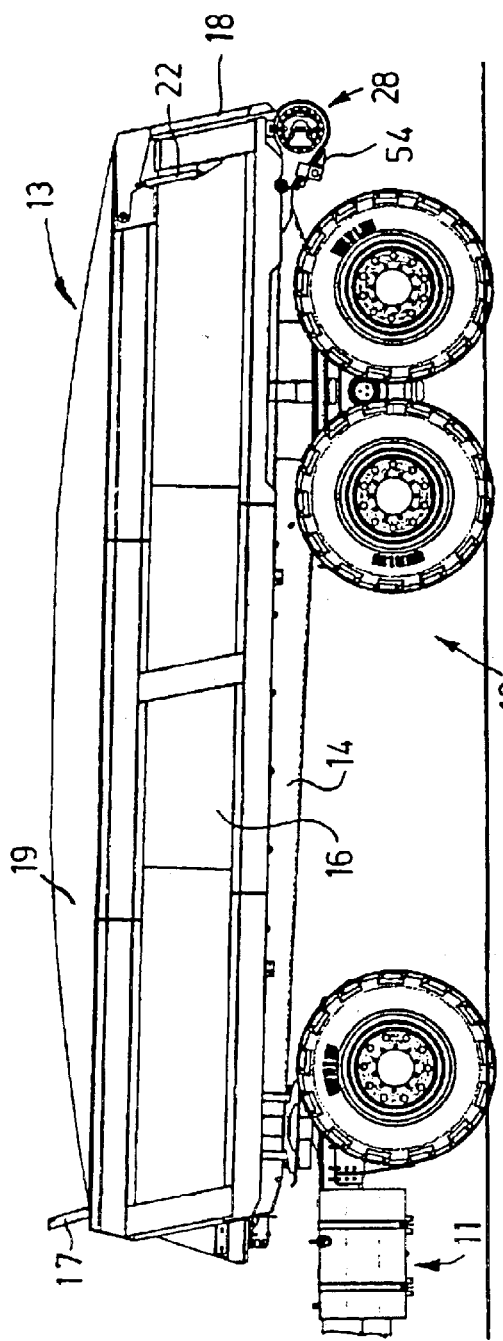
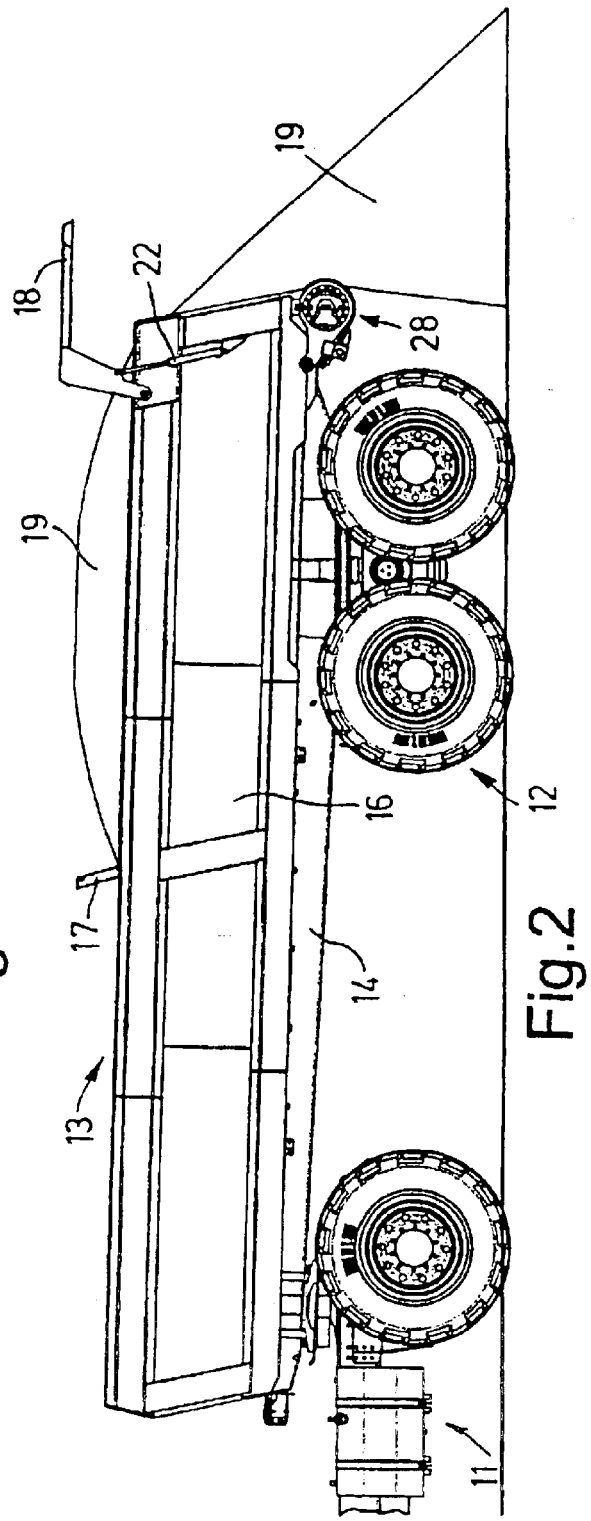

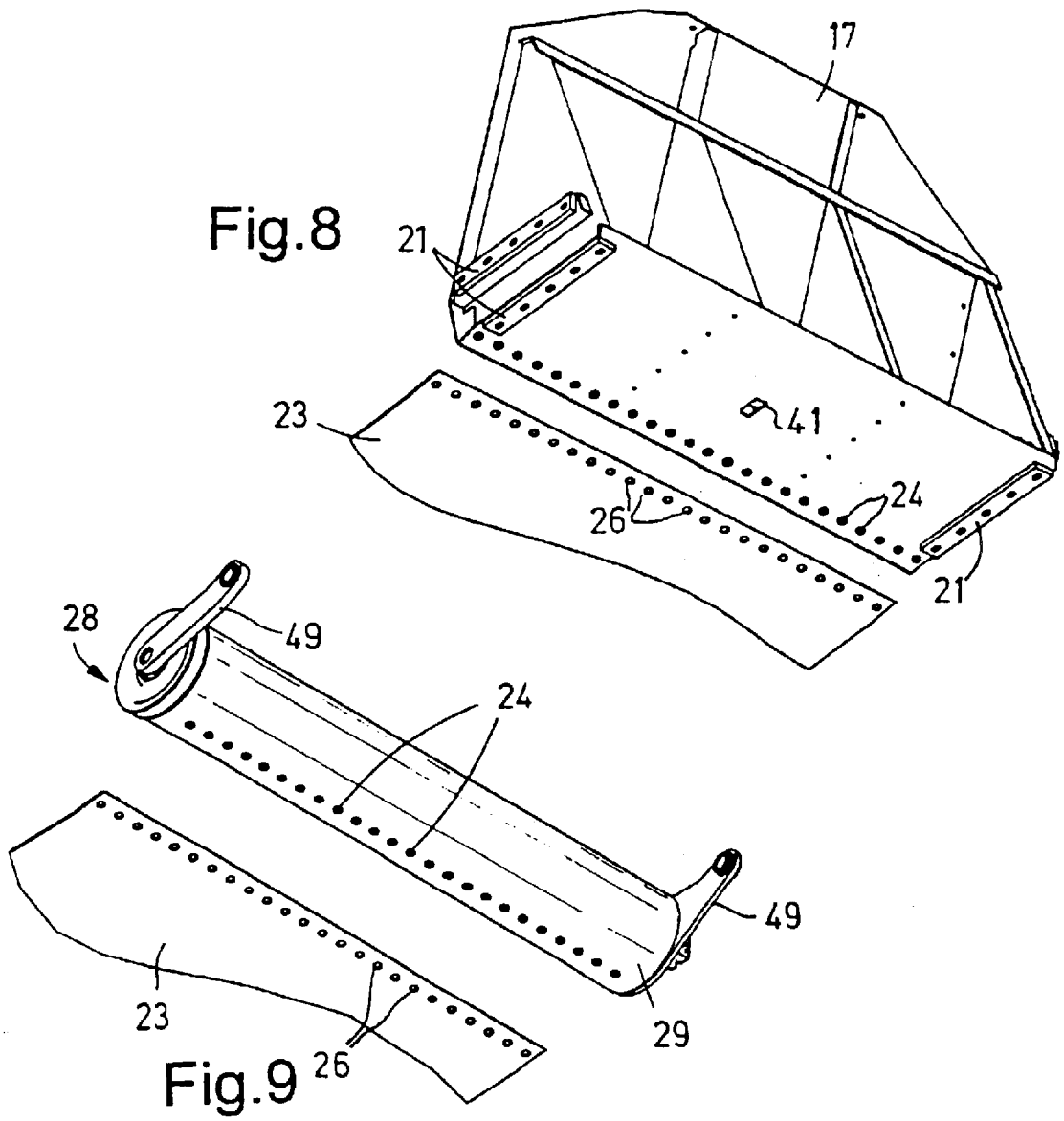
Fig.8
Fig.9
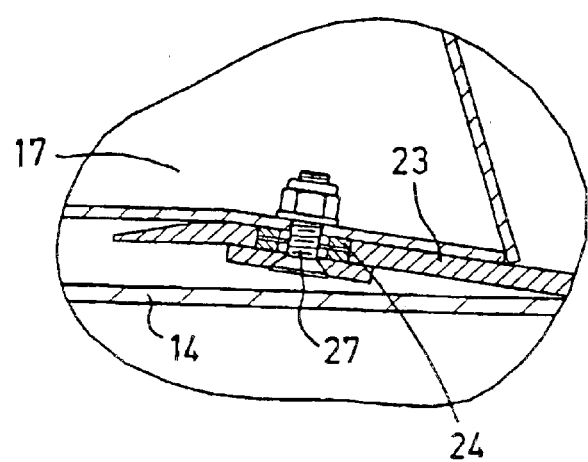
Fig.10

LOAD CARRYING BODY

CROSS REFERENCES

This application claims priority from earlier filed PCT/GB00/02277 filed on Jun. 13, 2000 which is based on earlier filed GB application No. 9913953.9 filed on Jun. 15, 2000. Priority is claimed thereon.

SUMMARY OF INVENTION

This invention relates to a load carrying body for a vehicle, in particular for the purpose of facilitating the unloading of material.

Conventionally, material such as earth, stones, rock, coal, or refuse is unloaded from a tipping body, in a manner which is difficult to control.

Ejector bodies are known in which material is pushed out of the body without tipping the body.

Such systems cannot deal with a variety of loads and body lengths.

The present invention provides a load carrying body with a flexible floor which is winched out of the rear end portion of the body.

Preferred features of the load carrying body are set forth in the claims.

The invention will be described further, by way of example only, with reference to the accompanying drawings.

BRIEF DESCRIPTION OF DRAWINGS

In the accompanying drawings:

FIG. 1 is a partial side view of an articulated vehicle having a trailer with a load carrying body in accordance with the invention, carrying a full load;

FIG. 2 is a view similar to FIG. 1, but with the load partly ejected;

FIG. 4b is a perspective view of the inverted body, corresponding to FIG. 4a;

FIG. 8 is a perspective view from below, showing one end part of a belt and the winch;

FIG. 9 is a perspective view from below, showing the other end part of the belt and a headboard;

FIG. 10 is an enlarged section through a connection between the belt and the headboard.

DETAIL DESCRPTION OF DRAWINGS

Figure 3:
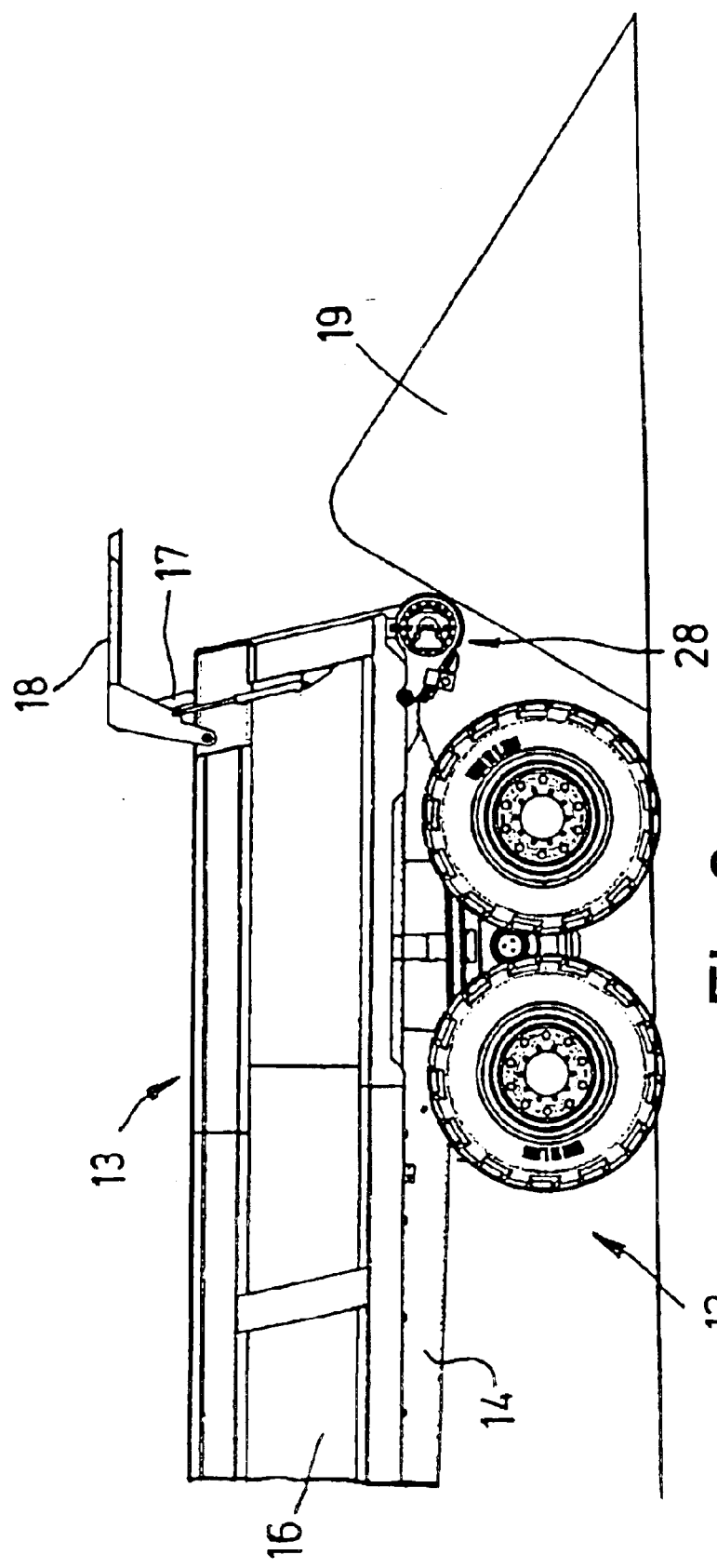
FIG. 3 is a view similar to FIG. 1, but with the load fully ejected.

The articulated vehicle illustrated in FIG. 1 comprises a tractor unit 11, including a cab and an internal combustion engine (not shown), and a trailer 12, including a load carrying body or ejector body 13 which has a base 14, fixed sidewalls 16, a movable transverse member or headboard 17 at the front end, and an upwardly swingable tailgate 18 at the rear end. As shown in FIG. 1, the body 13 is in an initial fully-laden condition and contains loose material 19 such as sand or aggregate.

Figure 4C:
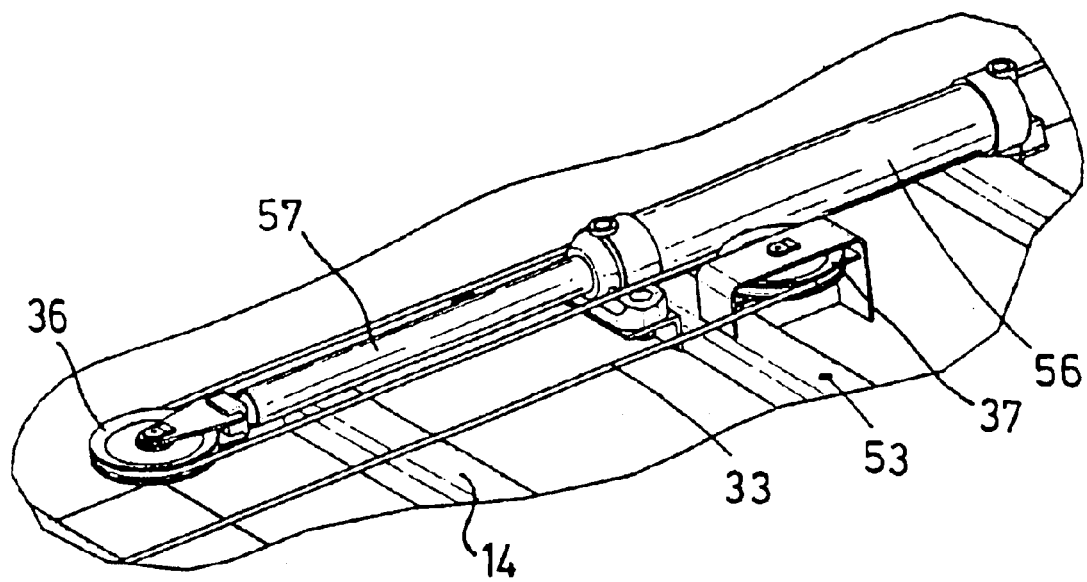
FIG. 4c is an enlargement of detail 4c in FIG. 4b.
Figure 4D:
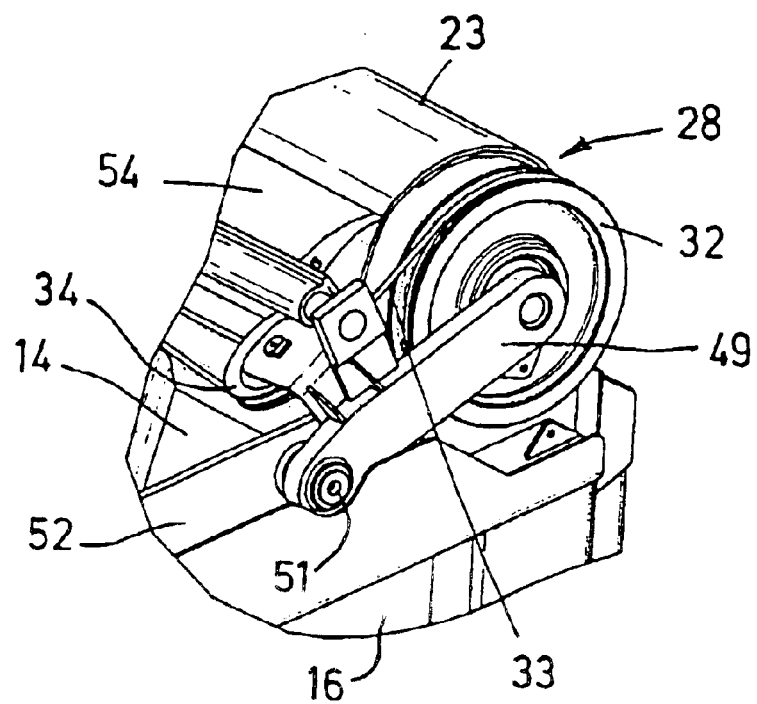
FIG. 4d is an enlargement of detail 4d in FIG. 4b.
Figure 4A:
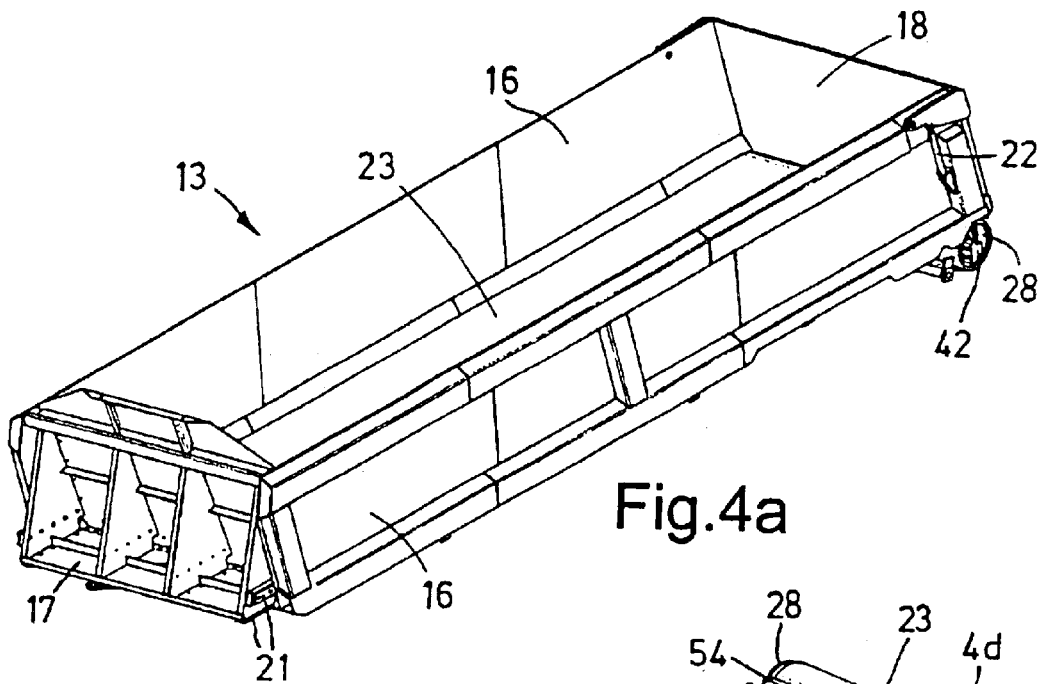
FIG. 4a is a perspective view of the body, corresponding to FIG. 1.
Figure 4B:
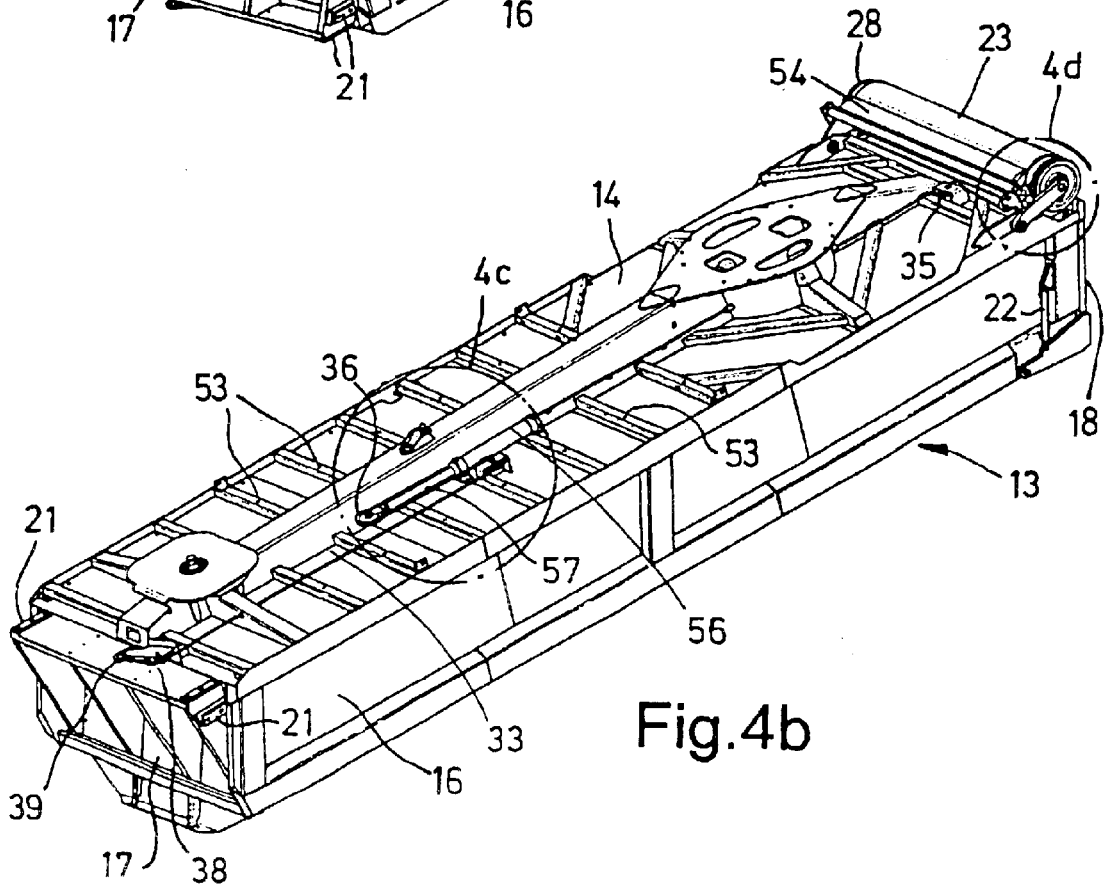
Figure 5A:
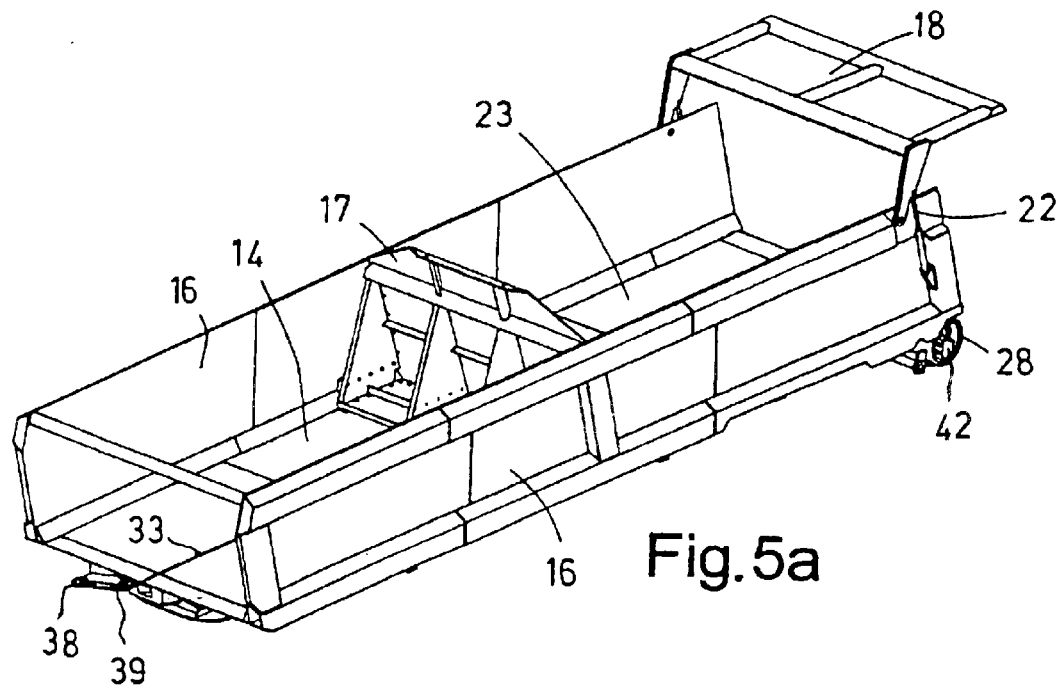
FIGS. 5a–d are similar to FIGS. 4a–d, but corresponding to FIG. 2.
Figure 5B:
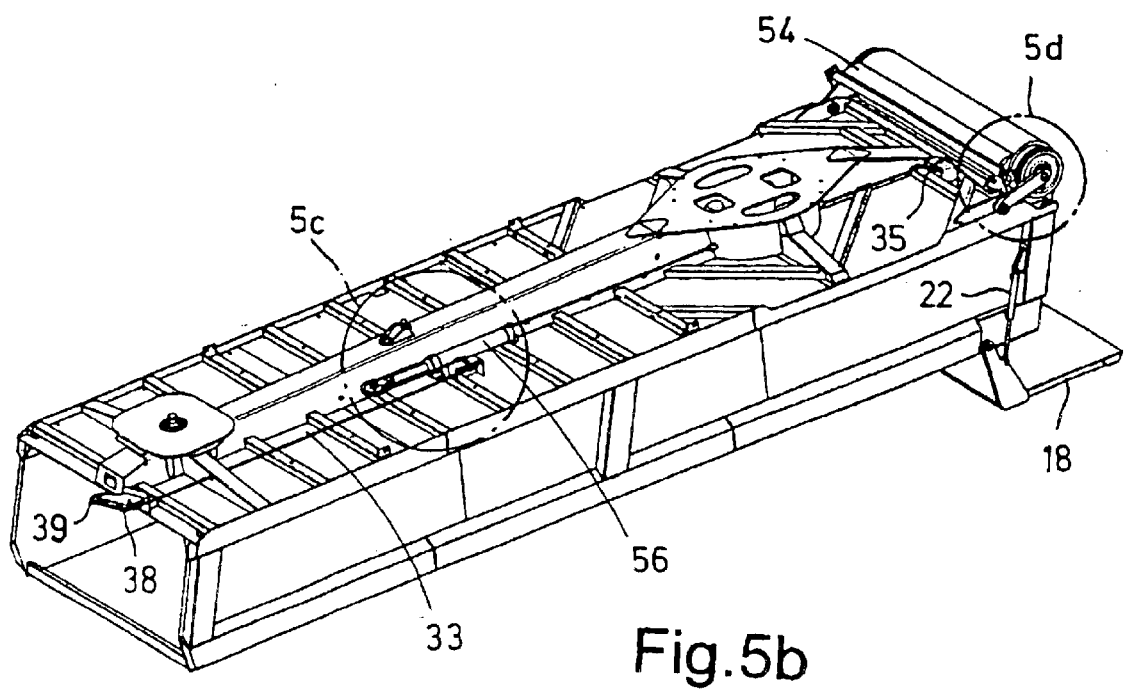
Figure 5C:
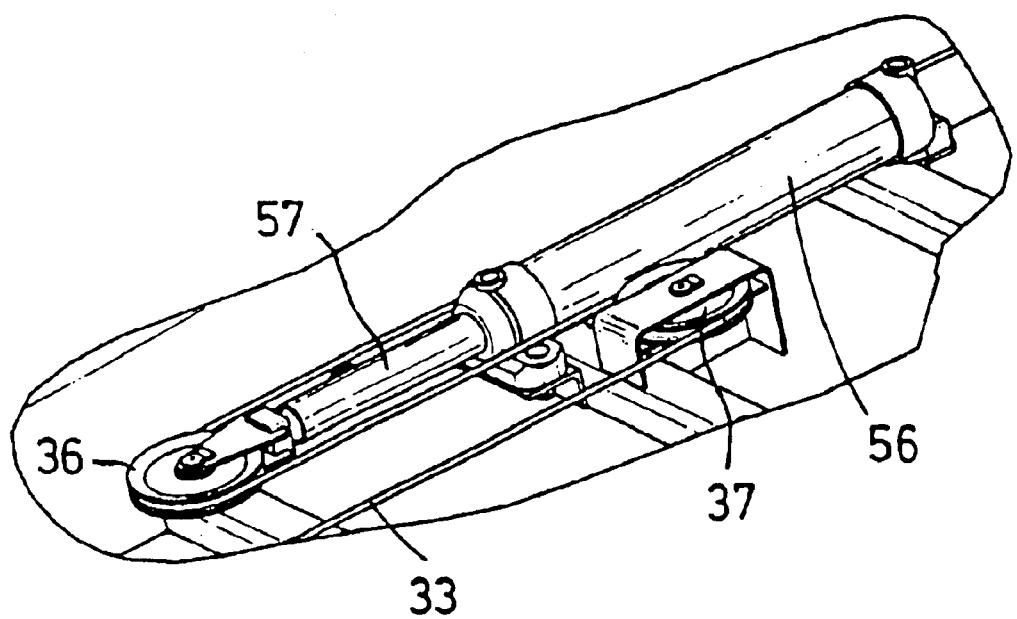
Figure 5D:
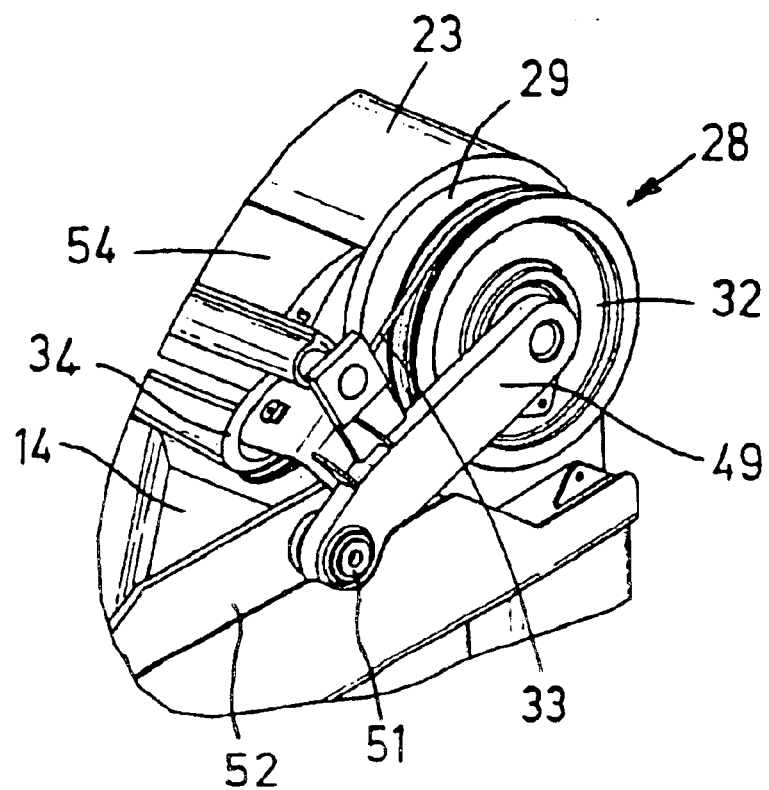
Figure 6A:
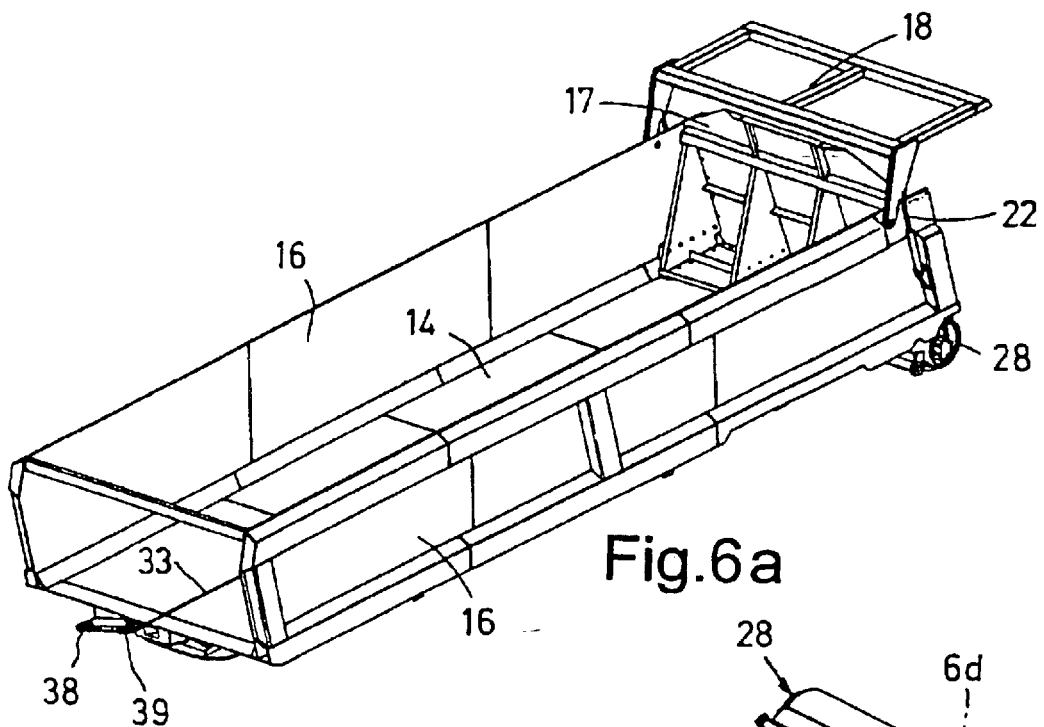
FIGS. 6a–d are similar to FIGS. 4a–d, but corresponding to FIG. 3.
Figure 6B:
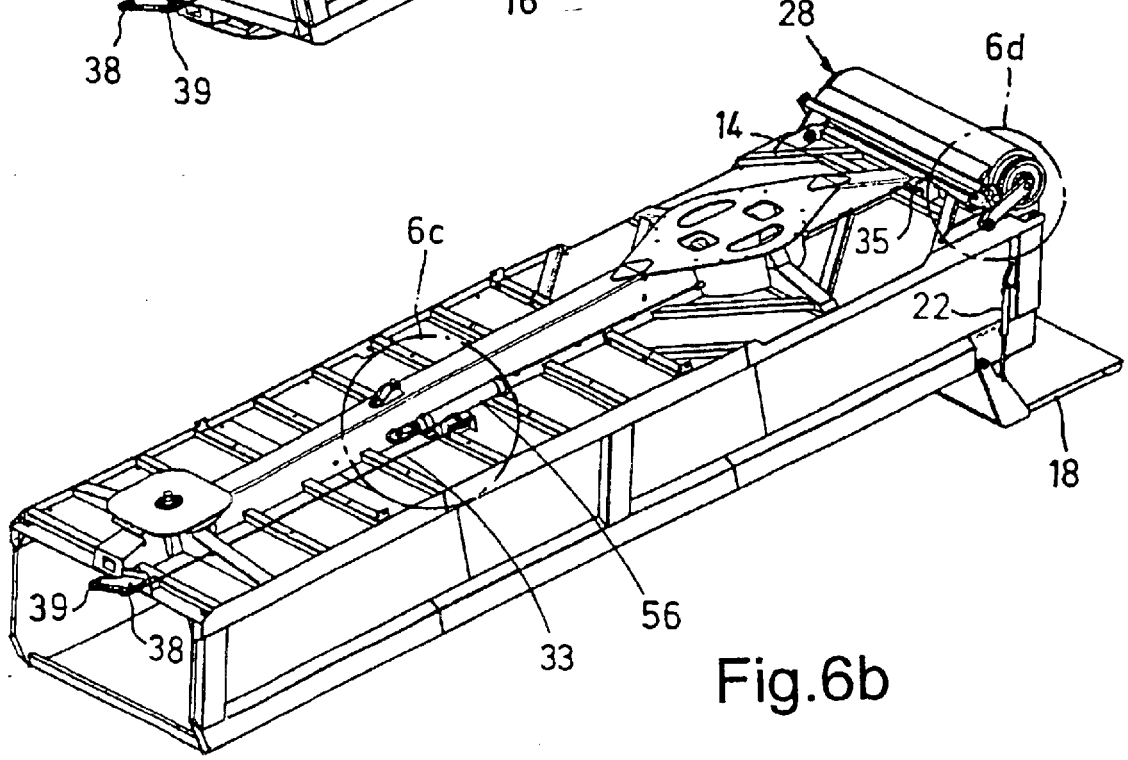
Figure 6C:
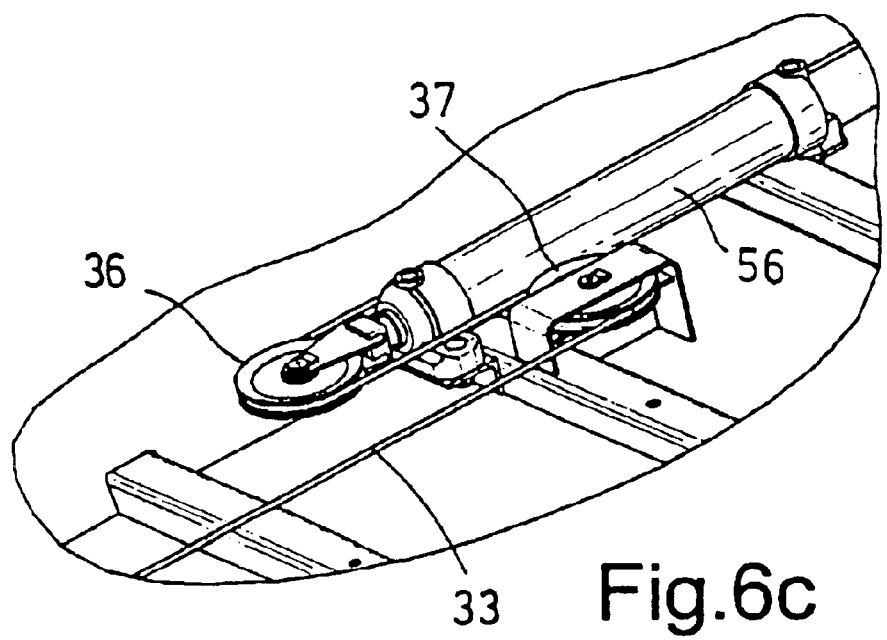
Figure 6D:
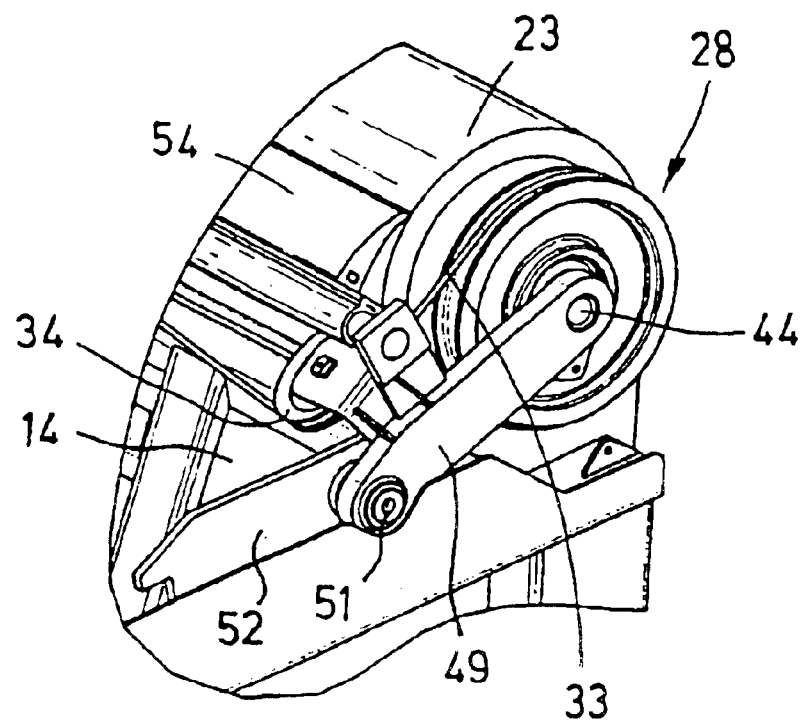
Figure 7:
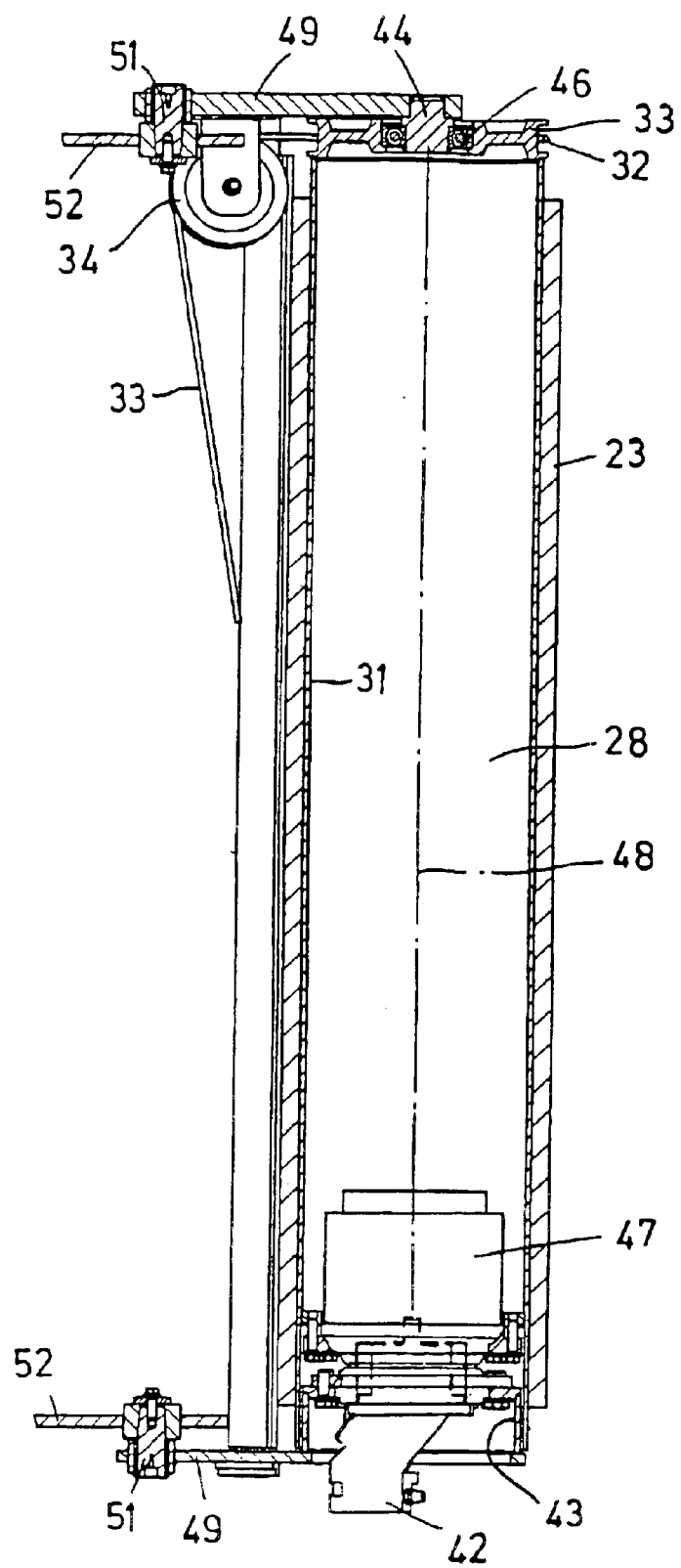
FIG. 7 is an axial section through a winch and its mounting to the base of the load carrying body.

The headboard 17 is movable along the upper surface of the base 14 between a front position (FIGS. 1, 4a, and 4b) and a rear position (FIGS. 3, 6a, and 6b). It has wear pads 21 which run against the upper surface of the base 14 and the inner surfaces of the sidewalls 16. The tailgate 18 is self-locking and, when unlocked, can be opened by means of hydraulic rams 22 or alternatively by the material 19 as it is ejected.

The floor of the load space between the headboard 17 and the rear end of the body 13 is constituted by a flexible belt 23 which rests on the substantially flat approximately horizontal upper surface of the base 14 and occupies the full width of the load space between the sidewalls 16. The belt is made of a hard wearing non-stretchable material, such as that used for conveyer belts in mining installations, for example. The front end of the belt 23 is releasably connected to the underside of the headboard 17 as shown in FIGS. 8 and 10. A transverse series of projections 24 provided in the form of circular annular steel discs are cross-welded to a bottom wall of the headboard 17. The projections 24 fit in corresponding holes 26, e.g. 50 mm in diameter, in the end portion of the belt 23, the belt being retained by bolts 27. The other end of the belt 23 passes over the rear end of the base 14 and is connected to a winch 28 lying below the level of the upper surface of the base 14.

The winch comprises a drum 29 having a hollow cylindrical peripheral wall 31 which extends over the full width of the load space and on which the belt 23 is wound. The outer surface of the cylindrical wall 31 is provided with a series of projections 24 (as described above) which fit in a series of holes 26 (as described above) provided in the adjacent end of the belt 23 (FIG. 9).

One end of the drum 29 is constituted by a sheave 32 on which is wound a cable 33 in the form of a steel wire rope, for example. The cable 33 is guided along a path as shown in the drawings by a guide system comprising rotatable guide elements or pulleys 34 to 39 and is connected to a lug 41 on the headboard 17 at a position substantially on the centre-line of the body 13.

The winch 28 has a reversible hydraulic motor 42 mounted in an annular frame 43 freely fitted in the end of the drum 29 opposite to the end closed by the sheave 32, which is mounted on an axle 44 by bearings 46 within the drum 29 and thereby kept out of contact with the loose material. The hydraulic motor 42 drives reduction gearing 47 bolted to the inside of the cylindrical wall 31 of the drum 29. The drum rotates about a horizontal axis 49 which extends transversely to the centre-line of the body 13 and which is defined by the bearings 46 and bearings (not shown) within the reduction gearing 47. The frame 43 and the axle 44 are fixed to perspective pivot arms 49 mounted on respective pivots 51 which are in turn mounted on flanges 52 fixed to the base 14.

To unload the fully laden trailer 12, the tailgate 18 is raised by means of the hydraulic rams 22 and the hydraulic motor 42 is operated to drive the drum 29 of the winch 28 in the clockwise direction as viewed in FIG. 1. The belt 23 is wound on to the winch, thereby drawing the floor of the load space towards the rear end of the base 14. The belt 23 thus carries the loose material 19 out of the rear end of the body 13 and deposits it as a gradually rising heap behind the trailer 12, as shown in FIGS. 2 and 3. The headboard 17, which is drawn along with the belt 23, merely serves to prevent forward spillage. Compressed air (or another fluid under pressure) can be injected under the floor in order to reduce friction between the belt 23 and the upper surface of the base 14, which may be of steel or aluminium, for example. The supply of compressed air may be discontinued after the floor has started to move or may be continued until the load has been completely discharged. Compressed air injection orifices 53 are provided in an array extending along and across the base and can be connected to piping (not shown) communicating with a compressor (not shown) driven by the engine of the vehicle. Loose material adhering to the surface of the belt 23 is removed by a spring-loaded scraper 54 which bears against the outer surface of the belt as it is wound on and off the winch.

As the winch 28 rotates in the clockwise direction and takes up the belt 23 on the drum 29, the sheave 32 pays out the cable 33 so that the headboard 17 is free to be drawn along the body 13 by the belt 23. When the motor 42 is reversed, the winch drum 29 pays out the belt 23 while the cable 33 is wound on to the sheave. 32, thereby causing the cable to draw the headboard 17 (and with it the belt 23) towards the front end of the base 14. It will be appreciated that the belt diameter on the drum 29 will normally differ from the cable diameter on the sheave 32. In particular, as the belt is wound on the drum, the belt diameter will gradually increase. On the other hand, since the turns of cable on the sheave 32 will normally lie next to one another, the cable diameter on the sheave will remain approximately constant. In order to compensate for the varying difference between the belt diameter and the cable diameter on the winch, the guide system for the cable 33 includes a compensating mechanism which varies the path of the cable during rotation of the winch 28. The compensating mechanism comprises a hydraulic cylinder 56 which drives a piston 57 carrying the pulley 36, around which the cable 33 turns through 180°. The hydraulic cylinder 56 is hydraulically linked to the hydraulic circuit of the motor 42, as shown in FIG. 11, so that the hydraulic pressure in the cylinder 56 is controlled to maintain the tension in the cable 33 approximately constant.

Figure 11:
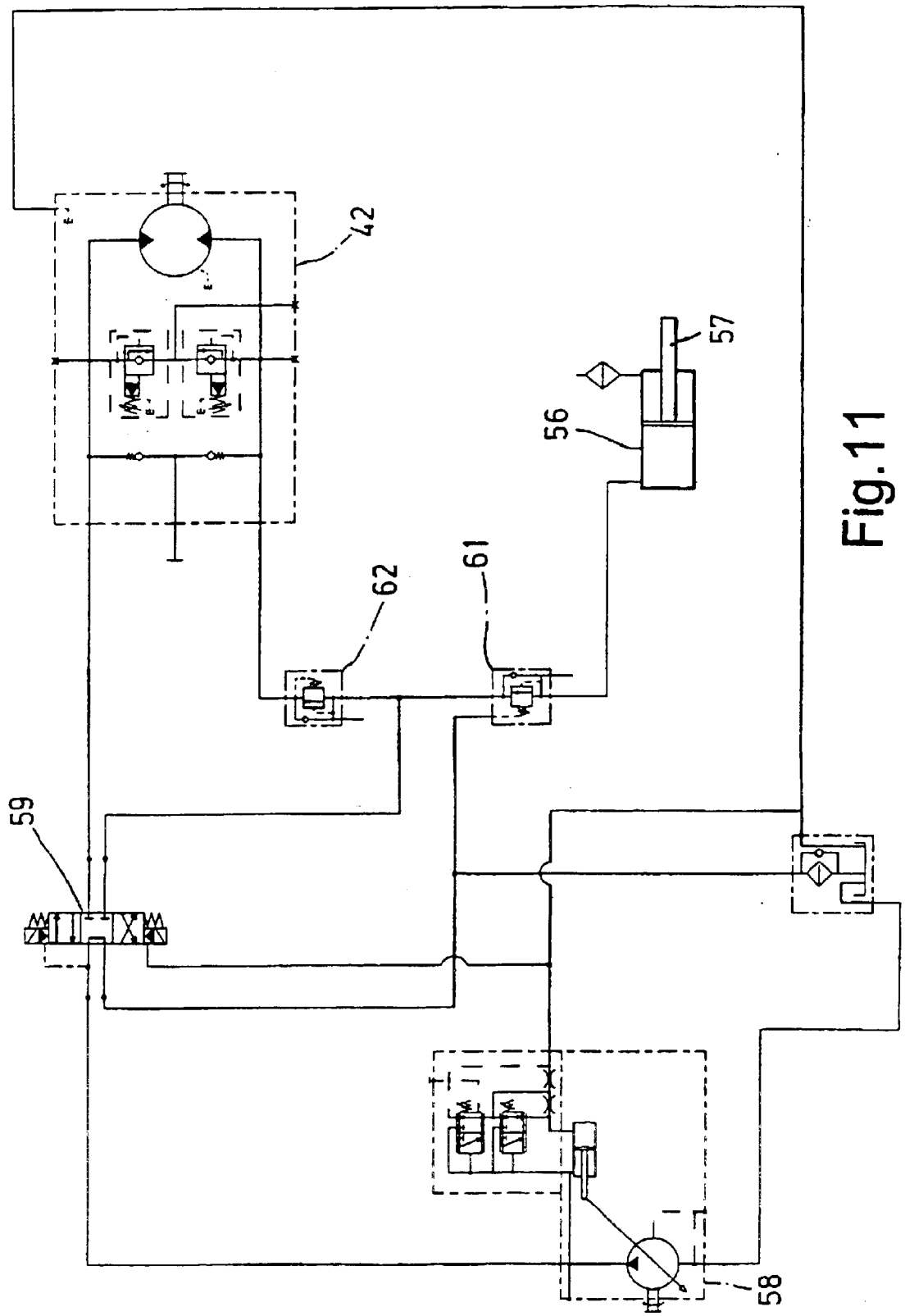
FIG. 11 is a diagram of a hydraulic circuit of the vehicle.

Referring to FIG. 11 in more detail, a hydraulic pump 58 is driven by a power take off from the engine of the vehicle, and the supply of hydraulic fluid from the pump 58 to the hydraulic motor 42 is controlled by a directional control valve 59, which is shown in the "off" position and which has two "on" positions for driving the motor 42 (and hence the winch 28) in opposite directions. The supply of hydraulic fluid pressure to the cylinder 56 is controlled by two valves 61,62. The control valve 61 is effective to control the cable tension as the cable 33 is unwound from the winch during the ejection of the loose material, and the control valve 62 is effective to control the cable tension during the winding of the cable 33 on to the winch 28 during retraction of the headboard 17 towards the front end of the load carrying body 13. The control valves 61,62 act in such a way as to keep the pressure acting on the piston 57 substantially constant. Thus, slackness in the cable 33 and in the belt 23 is avoided during the unloading of the loose material and the paying off of the belt from the winch.

During use, the wear on the belt 23 is uneven, gradually increasing from the end connected to the winch drum 29 towards the end connected to the headboard 17. The above-described connection of the belt ends to the drum and the headboard by means of the projection 24 and holes 26 provides the advantage that the worn belt can be turned round end to end in order to increase its useful life.

The ejection and retraction times are equal and typically can beset at 500 mm/s, which equates to 16 seconds for a load space 8 m long. The loose material can be ejected with the vehicle stationary or moving forwards or in reverse. It is easy to control ejection of only a portion of the loose material. The use of the body 13 is not restricted to the carrying of loose material, since the movable floor can assist in the loading and unloading of rigid loads such as palletised loads, for example, in conjunction with a fork lift truck or telescopic material handler.

What is claimed is:

1. A load carrying body for a vehicle, comprising:
   (a) a load-bearing base having front and rear ends;
   (b) a transverse member which is movable along the upper surface of the base between a front position and a rear position;
   (c) a reversible winch mounted to the base, the winch lying below the level of the upper surface of the base;
   (d) a floor constituted by a flexible belt which rests on the upper surface of the base, a first end of the belt being connected to the transverse member and a second, opposite end of the belt being connected to the winch so that rotation of the winch in a first direction winds the belt on to the winch, thereby drawing the floor and with it the transverse member towards the rear end of the base, and rotation of the winch in a second, opposite direction pays out the wound belt from the winch;
   (e) a cable having one end connected to the transverse member and the other end connected to the winch so that rotation of the winch in the said second direction winds the cable on to the winch; and
   (f) a guide system which guides the cable along a path such that rotation of the winch in the said second direction causes the cable to draw the transverse member and with it the floor towards the front end of the base, the guide system including a compensating mechanism which varies the path of the cable during rotation of the winch, so as to compensate for a difference between the belt diameter on the winch and the cable diameter on the winch, the difference varying as the belt it wound and unwound.

2. A load carrying body as claimed in claim 1, in which the winch is mounted so as to be pivotable relative to the base about a transverse pivot axis parallel to the winch axis.

3. A load carrying body as claimed in claim 1, in which the winch comprises a drum around which the belt is wound, one end of the drum constituting a sheave around which the cable is wound.

4. A load carrying body as claimed in claim 3, in which the winch includes a hydraulic motor at the other end of the drum.

5. A load carrying body as claimed in claim 4, in which the hydraulic motor drives the drum via reduction gearing within the drum.

6. A load carrying body as claimed in any of claims 3 to 5, in which the drum rotates about bearings within the drum.

7. A load carrying body as claimed in claim 1, in which the belt is releasably connected to the transverse member and to the winch so that the belt can be turned round end-to-end.

8. A load carrying body as claimed in claim 7, in which each end of the belt has a transverse series of holes which receive corresponding projections provided on the transverse member and the winch respectively.

9. A load carrying body as claimed in claim 1, including a scraper which bears against the outer surface of the belt as it is wound on and off the winch.

10. A load carrying body as claimed in claim 1, in which the compensating mechanism comprises a guide element around which the cable turns along the said path and a piston-and-cylinder device for moving the guide element to vary the said path.

11. A load carrying body as claimed in claim 1, in which the base has orifices for injecting fluid under pressure between the floor and the base in order to reduce friction.

* * * * *